United States Patent Office 3,746,703
Patented July 17, 1973

3,746,703
2,6-DICHLOROBENZYLIDENEHYDRAZIDES
William F. Bruce, Havertown, Pa., assignor to American Home Products Corporation, New York, N.Y.
No Drawing. Filed July 1, 1971, Ser. No. 159,056
Int. Cl. C07c 97/16; C09b 23/00
U.S. Cl. 260—562 H   16 Claims

ABSTRACT OF THE DISCLOSURE

Novel derivatives of 2,6-dichlorobenzylidenehydrazides have been prepared which have useful pharmacological activity.

DESCRIPTION OF THE INVENTION

This invention is concerned with novel pharmaceutical compounds of Formula I:

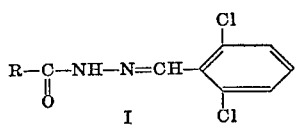

wherein R is selected from the group consisting of alkyl of 1 to about 10 carbon atoms, hydroxyalkyl, alkenyl, amino(lower)alkyl, thienyl, pyridyl, aminopyridyl, piperidyl, pyridyl(lower)alkyl, (lower)alkoxy(lower)alkyl, cyanoalkyl, cinnamyl, hydrazino, phenyl hydroxy(lower)alkyl,

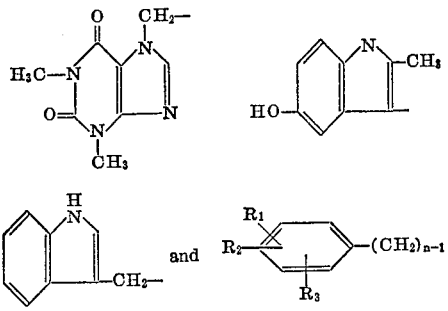

wherein $R_1$, $R_2$ and $R_3$ are independently selected from the group consisting of hydrogen halogen, hydroxy(lower) alkoxy, amino and (lower)alkyl and $n$ is an integer from 1 to 6.

The compounds of the invention are prepared by the admixture of 2,6-dichlorobenzaldehyde with the appropriate substituted hydrazide derivative in the presence of an organic solvent.

The compounds of Formula I of this invention have been found to exert a depressant action on the central nervous system when tested under standard and accepted pharmacological procedures, in animals, such as mice and rats. They are, therefore, deemed to possess utitlity in experimental and comparative pharamacology and are of value to treat conditions in animals, such as valuable domestic animals, and in laboratory animals, such as mice, rats and the like, responsive to treatment with central nervous system depressant agents. Specifically the compounds may be employed to induce a calming effect in mammals.

In the pharmacological evaluation of the biological activity of the compounds of this invention, the in vivo effects were tested as follows: The compound was administered orally to three mice (14 to 24 grams) at each of the following doses: 400, 127, 40 and 12.7 milligrams per kilogram of host body weight (m.p.k.). The animals were watched for a minimum of two hours during which time signs of general stimulation (i.e. increased spontaneous motor activity, hyperactivity on tactile stimulation, twitching general depression (i.e., decreased spontaneous motor activity, decreased respiration), autonomic activity (i.e., miosis, mydriasis, diarrhea) were noted.

The compounds of this invention induce central nervous system depressant effects at a dose of about 40 to about 400 m.p.k.

In addition to the above-described depressant activity many of the compounds possess useful hypotensive activity in mammals such as rats, at a dosage level of 10–100 milligrams per kg. of body weight p.o. Among those compounds which possess this actitvity are the following:

2,6-dichlorobenzylidene isonicotinic acid hydrazide;
2,6-dichlorobenzylidene nicotinic acid hydrazide;
2,6-dichlorobenzylidene butyric acid hydrazide;
2,6-dichlorobenzylidene 2-methyllactic acid hydrazide;
2,6-dichlorobenzylidene 3-methylthiopropionic acid hydrazide;
2,6-dichlorobenzylidene picolinic acid hydrazide;
2,6-dichlorobenzylidene 3-pyridineacetic acid hydrazide;
2,6-dichlorobenzylidene propionic acid hydrazide;
2,6-dichlorobenzylidene diethylaminoacetic acid hydrazide;
2,6-dichlorobenzylidene 2-pyridineacetic acid hydrazide;
2,6-dichlorobenzylidene valeric acid hydrazide;
2,6-dichlorobenzylidene hexanoic acid hydrazide;
2,6-dichlorobenzylidene 6-aminonicotinic acid hydrazide;
2,6-dichlorobenzylidene 3-ethoxypropionic acid hydrazide;
2,6-dichlorobenzylidene dimethylaminoacetic acid hydrazide;
2,6-dichlorobenzylidene lactic acid hydrazide;
2,6-dichlorobenzylidene formic acid hydrazide; and
2,6-dichlorobenzylidene isobutyric acid hydrazide.

When the compounds of the invention are administered for the purpose of inducing a therapeutic effect, they may be administered in combination with suitable diluents, solvents, excipients or carriers according to standard pharmaceutical practice. Suitable methods of preparing such compositions are well-known to those skilled in the art. The carriers may be selected from the group comprising lactose, sucrose, dextrose, starch, calcium carbonate or any other suitable ingredient. Other ingredients and materials for preparing oral or parenteral dosages forms may be found in the text titled, Remington's Practice of Pharmacy, 9th Ed., Mack Pub. Co., Easton, Pa. (1948) or any other standard reference work.

Many of the starting materials are commercially available or may be prepared according to methods set forth in the literature or as disclosed in the specific embodiments herein.

The following examples are given by way of illustration and are not construed as limitations of this invention, many variations of which are possible without departing from the scope and spirit thereof.

EXAMPLE I 2,6-dichlorobenzylidene isonicotinic acid hydrazide

A solution of 9 g. of 2,6-dichlorobenzaldehyde in 40 ml. of ethanol, with 7 g. of isonicotinic hydrazide in 15 ml. of acetic acid, heated two hours on a steam bath, gave on addition of 50 ml. of water 13 g. of white fibrous crystals, M.P. 213–4°.

*Analysis.*—Calc'd for $C_{13}H_9Cl_2N_3O$ (percent): C, 53.08; H, 3.08; Cl, 24.11; N, 14.29. Found (percent): C, 52.85; H, 3.00; Cl, 24.14; N, 14.19.

EXAMPLE II 2,6-dichlorobenzylidene salicylic acid hydrazide

A solution of 8 g. of 2,6-dichlorobenzaldehyde in 30 ml. of ethanol was filtered hot into a solution of 7 g. of salicyl hydrazide in 60 ml. of ethanol, giving a clear solution which soon deposited 12 g. of glistening white platelets, M.P. 216–7°.

*Analysis.*—Calc'd for $C_{14}H_{10}Cl_2N_2O_2$ (percent): C, 54.39; H, 3.26; Cl, 22.94; N, 9.06. Found (percent): C, 54.36; H, 3.32; Cl, 22.94; N, 9.01.

EXAMPLE III

2,6-dichlorobenzylidene nicotinic acid hydrazide

A solution of 5 g. of 2,6-dichlorobenzaldehyde in 30 ml. of ethanol, with 5 g. of nicotinic hydrazide in 25 ml. of ethanol heated twenty minutes on a steam bath gave 9 g. of white needles, M.P. 209–10°.

*Analysis.*—Calc'd for $C_{13}H_9Cl_2N_3O$ (percent): C, 53.08; H, 3.08; Cl, 24.11; N, 14.24. Found (percent): C, 53.04; H, 3.12; Cl, 23.94; N, 14.60.

EXAMPLE IV

2,6-dichlorobenzylidene benzoic acid hydrazide

A solution of 3.5 g. of 2,6-dichlorobenzaldehyde in 30 ml. of ethanol, with 2.5 g. of benzoylhydrazine in 30 ml. of ethanol, was warmed on a steam bath to give 6 g. of flaky white crystals, M.P. 226–7°.

*Analysis.*—Calc'd for $C_{14}H_{10}Cl_2N_2O$ (percent): C, 57.36; H, 3.44; Cl, 24.19; N, 9.56. Found (percent): C, 57.04; H, 3.64; Cl, 24.34; N, 9.41.

EXAMPLE V

2,6-dichlorobenzylidene p-anisic acid hydrazide

A solution of 5 g. of 2,6-dichlorobenzaldehyde in 30 ml. of ethanol, with 4 g. of p-anisoylhydrazine in 30 ml. of ethanol rapidly gave 8 g. of fibrous white crystals, M.P. 224–5°.

*Analysis.*—Calc'd for $C_{15}H_{12}Cl_2N_2O_2$ (percent): C, 55.74; H, 3.74; Cl, 21.94; N, 8.67. Found (percent): C, 55.61; H, 3.88; Cl, 21.91; N, 8.40.

EXAMPLE VI

2,6-dichlorobenzylidene anthranilic acid hydrazide

A solution of 5 g. of 2,6-dichlorobenzaldehyde in 30 ml. of ethanol, with 4.5 g. of anthraniloylhydrazine in 30 ml. of ethanol heated on a steam bath soon gave a voluminous white precipitate, M.P. 237–8°; 7 g.

*Analysis.*—Calc'd for $C_{14}H_{11}Cl_2N_3O$ (percent): C, 54.56; H, 3.60; Cl, 23.01; N, 13.64. Found (percent): C, 54.43; H, 3.78; Cl, 23.02; N, 13.69.

EXAMPLE VII

2,6-dichlorobenzylidene cinnamic acid hydrazide

A solution of 10 g. of 2,6-dichlorobenzaldehyde in 30 ml. of ethanol with 10 g. of cinnamoylhydrazine in 30 ml. of ethanol, heated on a steam bath gave 3 g. of yellow needles, M.P. 229–30°.

*Analysis.*—Calc'd for $C_{16}H_{12}Cl_2N_2O$ (percent): C, 60.11; H, 3.79; Cl, 22.18; N, 8.77. Found (percent): C, 59.83; H, 3.85; Cl, 22.00; N, 8.90.

EXAMPLE VIII

2,6-dichlorobenzylidene acetic acid hydrazide

A solution of 5 g. of 2,6-dichlorobenzaldehyde in 30 ml. of ethanol with 4.5 g. of acetylhydrazine in 30 ml. of ethanol heated fifteen minutes on a steam bath gave on cooling and seeding 5.5 g. of fine white needles, M.P. 201–2°.

*Analysis.*—Calc'd for $C_9H_8Cl_2N_2O$ (percent): C, 46.76; H, 3.49; Cl, 30.68; N, 12.12. Found (percent): C, 46.52; H, 3.51; Cl, 30.44; N, 12.39.

EXAMPLE IX

2,6-dichlorobenzylidene butyric acid hydrazide

A solution of 10 g. of 2,6-dichlorobenzaldehyde in 60 ml. of ethanol with 7 g. of butyroylhydrazine in 40 ml. of ethanol heated briefly on a steam bath gave 11 g. of light yellow needles, M.P. 154–5°.

*Analysis.*—Calc'd for $C_{11}H_{12}Cl_2N_2O$ (percent): C, 50.98; H, 4.67; N, 10.81. Found (percent): C, 50.62; H, 4.38; N, 10.69.

EXAMPLE X

2,6-dichlorobenzylidene 2-methyllactic acid hydrazide

A mixture of 12 g. of methyl 2-hydroxyisobutyrate and 5 g. of hydrazine hydrate was heated at 110° for two hours, then to 140° for ten minutes gave on cooling 9 g. of white granular crystals of 2-methylacetylhydrazine which was recrystallized from ethanol, M.P. 98.9°.

*Analysis.*—Calc'd for $C_4H_{10}N_2O_2$ (percent): C, 40.66; H, 8.53; N, 23.71. Found (percent): C, 40.78; H, 8.44; N, 23.70.

A solution of 5 g. of this compound in 35 ml. of ethanol with 7 g. of 2,6-dichlorobenzaldehyde in 30 ml. of ethanol heated twenty minutes on a steam bath gave on long standing 8 g. of shiny white microcrystals, M.P. 205–6°.

*Analysis.*—Cal'd for $C_{11}H_{12}Cl_2N_2O_2$ (percent): C, 48.02; H, 4.40; Cl, 25.77; N, 10.18. Found (percent): C, 48.13; H, 4.39; Cl, 25.62; N, 10.06.

EXAMPLE XI

2,6-dichlorobenzylidene 3-methylthiopropionic acid hydrazide

A mixture of 14 g. of methyl 3-methylthiopropionate and 6 ml. of hydrazine hydrate with 10 ml. of toluene heated gradually to 140° gave when cooled a solid (10 g.) which was crystallized from isopropanol to give 8 g. of white crystals, M.P. 158–9° after drying.

A solution of 5 g. of this compound in 25 ml. of ethanol with 6.5 g. of 2,6-dichlorobenzaldehyde heated briefly on a steam bath gave 5 g. of fluffy white crystals, M.P. 148–9°.

*Analysis.*—Calc'd for $C_{11}H_{12}Cl_2N_2OS$ (percent): C, 45.37; H, 4.16; Cl, 24.35; N, 9.62; S, 77.01. Found (percent): C, 45.20; H, 4.31; Cl, 24.14; N, 9.26; S, 10.94.

EXAMPLE XII

2,6-dichlorobenzylidene picolinic acid hydrazide

A solution of 6 g. of picolinoylhydrazine in 25 ml. of ethanol with 8.5 g. of 2,6-dichlorobenzaldehyde in 25 ml. of ethanol, heated for ten minutes on a steam bath gave 11 g. of white fibrous crystals, M.P. 209–10°.

*Analysis.*—Calc'd for $C_{13}H_9Cl_2N_3O$ (percent): C, 53.08; H, 3.08; Cl, 24.11; N, 14.26. Found (percent): C, 52.86; H, 3.16; Cl, 24.21; N, 14.15.

EXAMPLE XIII

2,6-dichlorobenzylidene 3,4,5-trimethoxybenzoic acid hydrazide

A solution of 4 g. of 2,6-dichlorobenzaldehyde in 30 ml. of ethanol, with 5 g. of 3,4,5-trimethoxybenzoylhydrazine in 30 ml. of ethanol, heated ten minutes on a steam bath, gave 10 g. of fibrous white crystals, M.P. 224–5°.

*Analysis.*Calc'd for $C_{17}H_{16}Cl_2N_2O_4$ (percent): C, 53.28; H, 4.21; Cl, 18.51; N, 7.30. Found (percent): C, 53.07; H, 4.19; Cl, 18.48; N, 7.06.

EXAMPLE XIV

2,6-dichlorobenzylidene 3-pyridineacetic acid hydrazide

A solution of 5 g. of 3-pyridineacetylhydrazine in 40 ml. of ethanol, with 7 g. of 2,6-dichlorobenzaldehyde in 40 ml. of ethanol, heated fifteen minutes on a steam bath, gave 6 g. of fine white crystals, M.P. 199–200°.

*Analysis.*—Calc'd for $C_{14}H_{11}Cl_2N_3O$ (percent): C, 54.56; H, 3.60; Cl, 23.01; N, 13.64. Found (percent): C, 54.47; H, 3.66; Cl, 23.31; N, 13.54.

EXAMPLE XV

2,6-dichlorobenzylidene propionic acid hydrazide

A solution of 5 g. of propionylhydrazine in 25 ml. of ethanol with 6 g. of 2,6-dichlorobenzaldehyde in 25 ml. of ethanol heated twenty minutes on a steam bath gave 5 g. of white fibrous crystals, with a yellowish cast in the shadows, M.P. 171–2°.

Analysis.—Calc'd for $C_{10}H_{10}Cl_2N_2O$ (percent): C, 49.00; H, 4.11; N, 11.43. Found (percent): C, 48.88; H, 4.03; N, 11.25.

EXAMPLE XVI

2,6-dichlorobenzylidene diethylaminoacetic acid hydrazide

A solution of 6.5 g. of 2,6-dichlorobenzaldehyde with 5 g. of diethylaminoacetylhydrazine in 50 ml. of ethanol, heated fifteen minutes on a steam bath gave after standing in an evaporating dish 6 g. of white needles, M.P. 94–5°.

Analysis.—Calc'd for $C_{13}H_{17}Cl_2N_3O$ (percent): C, 51.67; H, 5.67; Cl, 23,46; N, 13.91. Found (percent): C, 51.56; H, 5.42; Cl, 23.61; N, 13.76.

EXAMPLE XVII

2,6-dichlorobenzylidene p-hydroxybenzoic acid hydrazide

A solution of 5 g. of p-hydroxybenzoylhydrazine in 20 ml. of ethanol, 15 ml. of water and 30 ml. of dimethyl formamide, with 6 g. of 2,6-dichlorobenzaldehyde in 30 ml. of ethanol heated one hour on a steam bath, then diluted with about three volumes of water to incipient turbidity, deposited 8 g. of white powdery crystals which melted at 209–210° after crystallization from ethanol and dehydration at 150°.

Analysis.—Calc'd for $C_{14}H_{10}Cl_2N_2O_2$ (percent): C, 54.39; H, 3.26; N, 9.06. Found (percent): C, 54.38; H, 3.30; N, 9.00.

EXAMPLE XVIII

2,6-dichlorobenzylidene p-aminobenzoic acid hydrazide

A solution of 6 g. of p-aminobenzoic acid hydrazide in 50 ml. of ethanol with 7 g. of 2,6-dichlorobenzaldehyde in 30 ml. of ethanol heated ten minutes on a steam bath gave 8 g. of tiny yellowish plates, M.P. 248–9°.

Analysis.—Calc'd for $C_{14}H_{11}Cl_2N_3O$ (percent): C, 54.56; H, 3.60; Cl, 23.01; N, 13.64. Found (percent): C, 54.32; H, 3.76; Cl, 22.96; N, 13.44.

EXAMPLE XIX

2,6-dichlorobenzylidene mandelic acid hydrazide

A solution of 5 g. of mandelic acid hydrazide in 20 ml. of ethanol, with 6.5 g. of 2,6-dichlorobenzaldehyde in 30 ml. of ethanol heated half an hour on a steam bath gave 8 g. of white powdery crystals, M.P. 206–7°.

Analysis.—Calc'd for $C_{15}H_{12}Cl_2N_2O_2$ (percent): C, 55.74; H, 3.74; N, 8.67. Found (percent): C, 55.42; H, 3.87; N, 8.84.

EXAMPLE XX

2,6-dichlorobenzylidene 2-pyridineacetic acid hydrazide

A solution of 4 g. of 2-pyridineacetic acid hydrazide in 30 ml. of ethanol, with 5 g. of 2,6-dichlorobenzaldehyde in 30 ml. of ethanol, heated ten minutes on a steam bath, gave 6.5 g. of yellow needles, M.P. 215–6°.

Analysis.—Calc'd for $C_{14}H_{11}Cl_2N_3O$ (percent): C, 54.56; H, 3.60; Cl, 23.01; N, 13.64. Found (percent): C, 54.57; H, 3.74; Cl, 23.00; N, 13.91.

EXAMPLE XXI

2,6-dichlorobenzylidene 1,2,3,6-tetrahydro-1,3-dimethyl-2,6-dioxopurine-7-acetic acid hydrazide A solution of 4 g. of 7-theophylline acetic acid hydrazide in 20 ml. of ethanol with 15 ml. of 6 N hydrochloric acid and 30 ml. of water, with 5 g. of 2,6-dichlorobenzaldehyde in 25 ml. of ethanol, heated one minute on a steam bath, gave 5 g. of white precipitate with yellowish sheen, M.P. 295–6°.

Analysis.—Calc'd for $C_{16}H_{14}Cl_2N_6O_3$ (percent): C, 46.96; H, 3.45; N, 20.54. Found (percent): C, 46.68; H, 3.52; N, 20.32.

EXAMPLE XXII

2,6-dichlorobenzylidene 5-hydroxy-2-methylindole-3-carboxylic acid hydrazide A solution of 4 g. of 5-hydroxy-2-methylindole-3-carboxylic acid hydrazide in 20 ml. of ethanol and 15 ml. of dimethylformamide, with 5 g. of 2,6-dichlorobenzaldehyde in 30 ml. of ethanol, combined hot, gave 4.5 g. of tan powder, M.P. 316–7° C.

Analysis.—Calc'd for $C_{17}H_{13}Cl_2N_3O_2$ (percent): C, 56.37; H, 3.61; N, 11.63. Found (percent): C, 56.66; H, 3.98; N, 11.38.

EXAMPLE XXIII

2,6-dichlorobenzylidene valeric acid hydrazide

A solution of 2 g. of valeric acid hydrazide in 25 ml. of ethanol, with 4 g. of 2,6-dichlorobenzaldehyde in 20 ml. of ethanol, heated 20 minutes on a steam bath, gave on seeding 5 g. of yellow-white needles, M.P. 145–6°.

Analysis.—Calc'd for $C_{12}H_{14}Cl_2N_2O$ (percent): C, 52.76; H, 5.17; Cl, 25.96; N, 10.26. Found (percent): C, 52.64; H, 4.98; Cl, 26.03; N, 10.12.

EXAMPLE XXIV

2,6-dichlorobenzylidene indole-3-acetic acid hydrazide

A solution of 4 g. of indole-3-acetic acid hydrazide in 20 ml. of ethanol, with 4 g. of 2,6-dichlorobenzaldehyde in 25 ml. of ethanol, heated ten minutes on a steam bath, gave 8 g. of white powder, M.P. 214–5°.

Analysis.—Calc'd for $C_{17}H_{13}Cl_2N_3O$ (percent): C, 58.97; H, 3.78; Cl, 20.48; N, 12.14. Found (percent): C, 58.93; H, 4.06; Cl, 20.20; N, 12.13.

EXAMPLE XXV

2,6-dichlorobenzylidene heptanoic acid hydrazide

A solution of 2 g. of heptanoic acid hydrazide, M.P. 81–2°, in 20 ml. of ethanol, with 4 g. of 2,6-dichlorobenzaldehyde in 20 ml. of ethanol gave after one hour on a steam bath and concentration in a crystallizing dish 3 g. of yellowish rosettes, M.P. 134–5°.

Analysis.—Calc'd for $C_{14}H_{18}Cl_2N_2O$ (percent): C, 55.82; H, 6.02; Cl, 23.24; N, 9.30. Found (percent): C, 55.61; H, 5.96; Cl, 23.77; N, 9.20.

EXAMPLE XXVI

2,6-dichlorobenzylidene 2-thiophenecarboxylic acid hydrazide

A solution of 5 g. of 2-thiophenecarboxylic acid hydrazide in 30 ml. of ethanol, with 6 g. of 2,6-dichlorobenzaldehyde in 30 ml. of ethanol, heated half an hour on a steam bath gave on cooling 5 g. of white granular crystals, M.P. 202–3°.

Analysis.—Calc'd for $C_{12}H_8Cl_2N_2OS$ (percent): C, 48.17; H, 2.70; Cl, 23.70; N, 9.36; S, 10.72. Found (percent): C, 48.51; H, 2.97; Cl, 23.48; N, 9.37; S, 10.43.

EXAMPLE XXVII

2,6-dichlorobenzylidene hexanoic acid hydrazide

A solution of 5 g. of hexanoic acid hydrazide in 50 ml. of ethanol with 7 g. of 2,6-dichlorobenzaldehyde in 30 ml. of warm ethanol, heated ten minutes on a steam bath, gave 11 g. of yellowish white power, M.P. 161–2°.

Analysis.—Calc'd for $C_{13}H_{16}Cl_2N_2O$ (percent): C, 54.37; H, 5.62; Cl, 24.69; N, 9.67. Found (percent): C, 54.12; H, 5.45; Cl, 24.92; N, 9.65.

EXAMPLE XXVIII 2,6-dichlorobenzylidene 6-aminonicotinic acid hydrazide

A solution of 6 g. of 6-aminonicotinic acid hydrazide in 30 ml. of ethanol with 4 g. of 2,6-dichlorobenzaldehyde in 30 ml. of ethanol heated ten minutes on a steam bath gave 3 g. of white powder, M.P. 210–11°. On recrystallization from ethanol, the M.P. was raised to 219–20°.

Analysis.—Calc'd for $C_{11}H_{12}Cl_2N_2O$ (percent): C, 50.98; H, 4.67; Cl, 27.36; N, 10.81. Found (percent): C, 50.90; H, 4.65; Cl, 27.59; N, 10.83.

EXAMPLE XXIX 2,6-dichlorobenzylidene o-fluorobenzoic acid hydrazide

A solution of 3.5 g. of o-fluorobenzoic acid hydrazide in 30 ml. of ethanol, with 3.5 g. of 2,6-dichlorobenzaldehyde in 20 ml. of ethanol, heated ten minutes on a steam bath, gave 5 g. of fluffy white crystals, M.P. 224–5°.

EXAMPLE XXX 2,6-dichlorobenzylidene isonipecotic acid hydrazide

A solution of 4 g. of isonipecotic acid hydrazide in 30 ml. of ethanol, with 5 g. of 2,6-dichlorobenzaldehyde in 30 ml. of ethanol, heated ten minutes on the steam bath, gave 5.5 g. of yellowish white powder, M.P. 245–6° d.

Analysis.—Calc'd for $C_{13}H_{15}Cl_2U_3O$ (percent): C, 52.01; H, 5.04; Cl, 23.62; N, 13.83. Found (percent): C, 52.13; H, 5.26; Cl, 23.98; N, 13.21.

EXAMPLE XXXI 2,6-dichlorobenzylidene m-toluic acid hydrazide

A solution of 6 g. of m-toluic acid hydrazide in 30 ml. of ethanol with 7 g. of 2,6-dichlorobenzaldehyde in 30 ml. of ethanol, heated ten minutes on a steam bath, gave 11 g. of white fibrous crystals, M.P. 245–6°.

EXAMPLE XXXII 2,6-dichlorobenzylidene 2-octynoic acid hydrazide

A solution of 3 g. of octynoic acid hydrazide, M.P. 201–2°, made by heating ethyl 2-octynoate with hydrazine.

(Analysis.—Calc'd for $C_8H_{14}N_2O$ (percent): C, 62.30; H, 9.15; N, 18.17. Found (percent): C, 61.87; H, 9.11; N, 18.56), was heated one hour on a steam bath with 4.5 g. of 2,6-dichlorobenzaldehyde in 20 ml. of ethanol to give 6 g. of organge-yellow precipitate, M.P. 194–5°.

Analysis.—Calc'd for $C_{15}H_{16}Cl_2N_2O$ (percent): C, 57.89; H, 5.18; Cl, 22.80; N, 9.00. Found (percent): C, 57.57; H, 5.38; Cl, 22.80; N, 9.01.

EXAMPLE XXXIII 2,6-dichlorobenzylidene phenylacetic acid hydrazide

A solution of 5 g. of phenylacetic acid hydrazide in 20 ml. of ethanol, with 6 g. of 2,6-dichlorobenzaldehyde in 30 ml. of ethanol, heated one hour on a steam bath, gave 6 g. of white crystalline powder, M.P. 204–5°.

Analysis.—Calc'd for $C_{15}H_{12}Cl_2N_2O$ (percent): C, 58.65; H, 3.94; Cl, 23.08; N, 9.12. Found (percent): C, 58.69; H, 4.15; Cl, 22.89; N, 9.20.

EXAMPLE XXXIV 2,6-dichlorobenzylidene 3,4-dimethylbenzoic acid hydrazide

A solution of 4 g. of 3,4-dimethylbenzoic acid hydrazide in 30 ml. of ethanol, M.P. 123–4°, made by heating ethyl 3,4-dimethylbenzoate with hydrazine (Anal. Calc'd for $C_9H_{12}N_2O$ (percent): N, 17.06. Found (percent): N, 16.52) with 5 g. of 2,6-dichlorobenzaldehyde in 25 ml. of ethanol, heated 30 min. on a steam bath, gave 6 g. of white fibrous products, M.P. 247–8°.

Analysis.—Calc'd for $C_{16}H_{14}Cl_2N_2O$ (percent): C, 59.82; H, 4.39; Cl, 22.08; N, 8.72. Found (percent): C, 59.82; H, 4.45; Cl, 21.96; N, 890.

EXAMPLE XXV 2,6-dichlorobenzylidene 3-ethoxypropionic acid hydrazide

A solution of 5 g. of crude 3-ethoxypropionic acid hydrazide, made by heating 3-ethoxypropionic acid ethyl ester with hydrazine, in 30 ml. of ethanol, with 6 g. of 2,6-dichlorobenzaldehyde in 30 ml. of ethanol gave at once a yellow precipitate, M.P. 155–6°, the azine of the aldehyde, which was filtered off, and the filtrate was heated two hours on a steam bath, gave 2.5 g. of white needles, M.P. 133–4°.

Analysis.—Calc'd for $C_{12}H_{14}Cl_2N_2O_2$ (percent): C, 49.84; H, 4.77; N, 9.69. Found (percent): C, 49.69; H, 4.51; N, 9.39.

EXAMPLE XXXVI 2,6-dichlorobenzylidene dimethylaminoacetic acid hydrazide

A solution of 5 g. of dimethylaminoacetic acid hydrazide in 20 ml. of ethanol, with 6 g. of 2,6-dichlorobenzaldehyde in 20 ml. of hot ethanol, heated ten minutes on a steam bath gave a small amount of yellow percipitate, M.P. 155–6°, the azine, which was removed by filtration; the filtrate, in a crystallizing dish, gave 3 g. of white granular solid, M.P. 131–2°.

Analysis.—Calc'd for $C_{11}H_{13}Cl_2N_3O$ (percent): C, 48.19; H, 4.78; Cl, 25.87; N, 15.33. Found (percent): C, 48.08; H, 4.87; Cl, 25.89; N, 15.29.

EXAMPLE XXXVII 2,6-dichlorobenzylidene lactic acid hydrazide

A solution of 7 g. of syrupy lactic acid hydrazide, containing some hydrazine, in 40 ml. of ethanol with 10 g. of 2,6-dichlorobenzaldehyde in 40 ml. of ethanol, heated ten minutes on a steam bath, gave 2 g. of the azine, M.P. 153–4°, which was removed by filtration. The filtrate in a crystallizing dish gave 7 g. of white flaky solid, M.P. 121–2°.

Analysis.—Calc'd for $C_{10}H_{10}Cl_2N_2O_2$ (percent): C, 46.00; H, 3.86; Cl, 27.16, N, 10.73. Found (percent): C, 45.89; H, 3.99; Cl, 27.39; N, 11.08.

EXAMPLE XXXVIII 2,6-dichlorobenzylidene cyanoacetic acid hydrazide

A solution of 4 g. of cyanoacetic acid hydrazide in 40 ml. of ethanol with 5 g. of 2,6-dichlorobenzaldehyde in 30 ml. of ethanol, heated ten minutes on a steam bath, gave 7 g. of buff powder, M.P. 219–20° d.

Analysis.—Calc'd for $C_{10}H_7Cl_2N_3O$ (percent): C, 46.90; H, 2.76; Cl, 27.69; N, 16.41. Found (percent): C, 46.82; H, 2.79; Cl, 27.49; N, 16.32.

EXAMPLE XXXIX 2,6-dichlorobenzylidene formic acid hydrazide

A solution of 3 g. of formic acid hydrazide in 25 ml. of ethanol, with 6 g. of 2,6-dichlorobenzaldehyde in 25 ml. of ethanol, heated ten minutes on a steam bath gave a fibrous white precipitate, 6 g., M.P. 165–6°.

Analysis.—Calc'd for $C_8H_6Cl_2N_2O$ (percent): C, 44.26; H, 2.79; Cl, 32.67; N, 12.91. Found (percent): C, 44.02; H, 2.84; Cl, 32.52; N, 13.12.

EXAMPLE XL 2,6-dichlorobenzylidene isobutyric acid hydrazide

A solution of 4 g. of isobutyric acid hydrazide in 20 ml. of ethanol, with 5 g. of 2,6-dichlorobenzaldehyde in 25 ml. of ethanol, heated ten minutes on a steam bath, gave 3.5 g. of yellowish-white fluffy needles, M.P. 203–4°.

Analysis.—Calc'd for $C_{11}H_{12}Cl_2N_2O$ (percent): C, 50.98; H,, 4.67; Cl, 27.36; N, 10.81. Found (percent): C, 50.90; H, 4.65; Cl, 27.59; N, 10.83.

EXAMPLE XLI

2,6-dichlorobenzylidene carbohydrazide

A solution of 4 g. of 2,6-dichlorobenzaldehyde in 50 ml. of ethanol was added slowly to 5 g. of carbohydrazide in 40 ml. of water and 5 ml. of acetic acid on a steam bath. On cooling, 2.3 g. of fluffy white crystals separated M.P. 310° d. Recrystallized from ethanol, this melted at 216–7°.

*Analysis.*—Calc'd for $C_8H_8Cl_2N_4O$ (percent): C, 38.88; H, 3.26; Cl, 28.70; N, 22.68. Found (percent): C, 38.86; H, 3.23; Cl, 28.90; N, 22.17.

I claim:

1. A compound selected from the group consisting of:

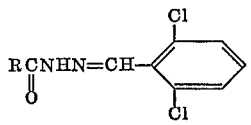

wherein

R is a radical selected from the group consisting of —H, alkyl of 1 to 6 carbon atoms, hydroxy(lower)alkyl, (lower)alkoxy(lower)alkyl, (lower)alkylthio(lower)alkyl and di(lower)alkylamino(lower)alkyl.

2. A compound selected from the group consisting of the 2,6-dichlorobenzylidenehydrazides of formic acid, propionic acid, butyric acid, isobutyric acid, valeric acid, hexanoic acid, 2-methyllactic acid, lactic acid, 3-ethoxypropionic acid, 3-methylthiopropionic acid, dimethylaminoacetic acid and diethylaminoacetic acid.

3. A compound as defined in claim 1 which is: 2,6-dichlorobenzylidene acetic acid hydrazide.

4. A compound as defined in claim 1 which is: 2,6-dichlorobenzylidene butyric acid hydrazide.

5. A compound as defined in claim 1 which is: 2,6-dichlorobenzylidene 2-methyllactic acid hydrazide.

6. A compound as defined in claim 1 which is: 2,6-dichlorobenzylidene 3-methylthiopropionic acid hydrazide.

7. A compound as defined in claim 1 which is: 2,6-dichlorobenzylidene propionic acid hydrazide.

8. A compound as defined in claim 1 which is: 2,6-dichlorobenzylidene diethylaminoacetic acid hydrazide.

9. A compound as defined in claim 1 which is: 2,6-dichlorobenzylidene mandelic acid hydrazide.

10. A compound as defined in claim 1 which is: 2,6-dichlorobenzylidene valeric acid hydrazide.

11. A compound as defined in claim 1 which is: 2,6-dichlorobenzylidene hexanoic acid hydrazide.

12. A compound as defined in claim 1 which is: 2,6-dichlorobenzylidene 3-ethoxypropionic acid hydrazide.

13. A compound as defined in claim 1 which is: 2,6-dichlorobenzylidene dimethylaminoacetic acid hydrazide.

14. A compound as defined in claim 1 which is: 2,6-dichlorobenzylidene lactic acid hydrazide.

15. A compound as defined in claim 1 which is: 2,6-dichlorobenzylidene formic acid hydrazide.

16. A compound as defined in claim 1 which is: 2,6-dichlorobenzylidene isobutyric acid hydrazide.

References Cited

UNITED STATES PATENTS

| | | | |
|---|---|---|---|
| 3,055,938 | 9/1962 | Remy | 260—562 H |
| 3,547,646 | 12/1970 | Hori et al. | 260—562 H |

FOREIGN PATENTS

| | | | |
|---|---|---|---|
| 226,215 | 3/1963 | Austria | 260—562 H |

OTHER REFERENCES

Buu-Hoi et al., J. Chem. Soc. 1953, pp. 547 to 549.
Offe et al., Z. Naturforsch., vol. 7B, pp. 449 to 455 (1952).
Sah et al., J. Am. Pharm. Assoc., vol. 93, pp. 513 to 523.

JOHN D. RANDOLPH, Primary Examiner

U.S. Cl. X.R.

260—240 G, 465 D, 558 H, 559 H; 424—251, 263, 264, 274, 320